United States Patent
Li et al.

(10) Patent No.: US 8,133,025 B2
(45) Date of Patent: Mar. 13, 2012

(54) TURBINE BLADE SYSTEM

(75) Inventors: Anan Li, Manassas, VA (US); Pier Marzoca, Potsdam, NY (US); Reginald Trevor Taylor, Le Tallud (FR)

(73) Assignee: ARI Green Technology, LLC, Jacksonville, FL (US)

( * ) Notice: Subject to any disclaimer, the term of this patent is extended or adjusted under 35 U.S.C. 154(b) by 574 days.

(21) Appl. No.: 12/362,325

(22) Filed: Jan. 29, 2009

(65) Prior Publication Data

US 2010/0028149 A1    Feb. 4, 2010

Related U.S. Application Data

(60) Provisional application No. 61/084,563, filed on Jul. 29, 2008.

(51) Int. Cl.
*F01D 5/18* (2006.01)
*F01D 5/14* (2006.01)

(52) U.S. Cl. .......................................... 416/91; 416/228

(58) Field of Classification Search .................. 415/119, 415/914; 244/1 N, 17.11, 17.19, 198, 199.1, 244/199.2, 199.3, 199.4, 200.1, 207, 208, 244/209, 123.1, 124; 416/90 R, 91, 196 A, 416/228

See application file for complete search history.

(56) References Cited

U.S. PATENT DOCUMENTS

| | | | | |
|---|---|---|---|---|
| 3,270,988 A | * | 9/1966 | Cone, Jr. | 244/35 R |
| 3,596,854 A | * | 8/1971 | Haney, Jr. | 244/199.3 |
| 3,692,259 A | * | 9/1972 | Yuan | 244/199.3 |
| 3,881,669 A | * | 5/1975 | Lessen | 244/199.3 |
| 3,936,013 A | * | 2/1976 | Yuan | 244/199.3 |
| 3,997,132 A | * | 12/1976 | Erwin | 244/199.3 |
| 4,382,569 A | * | 5/1983 | Boppe et al. | 244/199.4 |
| 4,722,499 A | * | 2/1988 | Klug | 244/199.4 |
| 5,297,764 A | * | 3/1994 | Haney | 244/199.3 |
| 7,278,825 B2 | * | 10/2007 | Segota et al. | 416/62 |
| 2006/0018759 A1 | * | 1/2006 | Moser | 416/223 R |
| 2007/0252047 A1 | * | 11/2007 | Pal | 244/35 R |
| 2007/0286728 A1 | * | 12/2007 | Hotto | 416/1 |
| 2008/0035789 A1 | * | 2/2008 | Lewis et al. | 244/1 R |

* cited by examiner

*Primary Examiner* — Kiesha Bryant
*Assistant Examiner* — Abbigale Boyle
(74) *Attorney, Agent, or Firm* — Michael L. Greenberg, Esq.; Greenberg & Lieberman, LLC

(57) ABSTRACT

A turbine blade system relating to a tip device appended to the blade tip of a turbine. The tip device controls the flow of air to ultimately reduce noise signatures while increasing aerodynamic efficiency. Passive or actively controlled configurations also permit the user to adjust the pitch angle of the tip device for maximum efficiency rather than making less effective adjustments to the entire turbine blade.

20 Claims, 20 Drawing Sheets

TURBINE BLADE SYSTEM

This is a non-provisional application claiming priority to provisional patent application No. 61/084,563 filed on Jul. 29, 2008.

FIELD OF THE INVENTION

The present invention is a turbine blade system relating to a tip device appended to the blade tip of a turbine so that the tip device controls the flow of air to ultimately reduce noise and increase aerodynamic efficiency. Passive or actively controlled configurations of the present invention also permit the user to adjust the pitch angle of the tip device for maximum efficiency rather than making less effective adjustments to the entire turbine blade.

BACKGROUND OF THE PRESENT INVENTION

The consumption of traditional sources of energy continues to increase exponentially. This has burdened millions of people and nearly every nation with the task of supplying and maintaining fossil fuels to feed everything from home electricity to industry to transportation. This situation has proven costly in terms of supply as well as environmentally. Because of this, development of alternative sources of energy is crucial. However, there is a need for alternative sources of energy that conform with not only the energy needs of the population, but also other extraneous needs such as aesthetics, efficiency and convenience.

Renewable energy sources have the most potential for providing an efficient and economically viable alternative. Wind energy is the fastest growing energy technology in the world. The importance of realizing sustainable energy sources that are both economically viable as well as environmentally safe is evident but certainly no easy goal to fulfill. Innovative technological improvements of wind-turbine design have the potential to lower the cost of energy well below the U.S. government proposed $0.025/kWhr within the next few years.

While variations of wind turbines certainly exist, there continues to be a need for turbine blades that are both aerodynamic and quiet. Almost all large wind turbines built today have pitch bearings at the blade root so that the pitch of the whole blade can easily be changed by activating the pitch mechanism. Pitching of the blade is used as a brake to stop the rotor, but it is also used for power and load control in different ways. On active stall controlled turbines, a relative slow variation of the pitch of the blades is used to adjust the pitch so that stall on the blade occurs at the right maximum power. But pitch also is active at low wind speed to maximize the power. On pitch controlled wind turbines, the pitch at high wind is changed continuously so that the maximum power is not exceeded. This is done by reducing the inflow angle to the blade when the wind speed is increasing. The pitch also is used at low wind speeds to maximize the power. Recently, new types of pitch regulated wind turbines also use the pitch system to reduce the dynamic loads, either by cyclic pitch or by individual blade pitch. Different input signals to the control system such as flap-wise loading can be used. While the pitch adjustments for the entire turbine blade have shown some effect, there remains a need to increase upon those early advances in a manner that is even more efficient and also quieter. The present invention satisfies this need by appending a tip device and various sensors and controls that serve to either passively or actively adjust only the pitch of the tip device rather than the entire turbine blade. By conducting the process in this manner, the present invention presents a more efficient system that has the important additional benefit of reduced noise signature.

Apart from the above existing control with blade pitching, control of power and loads by movable, small control surfaces are available. Among them there is a partial span aileron system for control of power and rotor rotational speed. The aileron system is similar to trailing-edge flaps for airplanes. Gurney flaps attached to the trailing edge of the blades have as well been proposed and analyzed. The advantage of a small control surface is a possible faster response due to less inertia than if the whole blade is being pitched. One disadvantage of Gurney flaps, however, is the increase in aerodynamic noise from the free ends of the Gurney flaps and from the gaps in the blade where the Gurney flap is positioned. The present invention, in contrast, solves this noise problem by controlling the pitch angle of the tip device so that the flow passes through its cylinder in a manner that reduces noise.

The proposed flow control devices installed at the blade tip of the present invention can operate in passive, active or hybrid mode. As opposed to available active rotor control and passive control usually only suitable to large wind turbines, the present invention is suitable to a variety of wind turbines ranging from small to large. The tip device produces an aerodynamic flow jet that will improve the performance of the blade tip aerodynamics contributing to the overall performance of the wind turbine.

SUMMARY OF THE PRESENT INVENTION

The present invention relates to a tip device that is appended, or otherwise in communication with the blade tip of a turbine. The tip device is such that it enhances the power production generated from a wind turbine and also reduces the noise signature of the turbine. The result from the point of view of the user is that the tip device lets the user have the effects of adjusting the pitch through the tip device rather than having to endure the costly and burdensome process of adjusting the pitch through the entire turbine blade.

At the same time, the tip device is such that it enhances the power production and subsequent noise signature reduction through either a passive configuration or active configuration. Actuators and sensors in the preferred embodiment are installed onto the turbine blade to assist in identifying changing conditions with wind and resistance. The tip device then acts and controls flow on the trailing edge eddy that is created from the turbine blade rotation.

While the tip device is appended to the blade tip of a turbine, the tip device itself achieves the noise reduction and increased power production through a plurality of cylinders and/or holes depending on the embodiment. These cylinders or holes are such that as wind passes through the opening, the swirl of the flow is enhanced. The jet flow that is produced, meanwhile, operates on the flowfield around the blade tip for maximum performance and minimal noise output. The tip devices also are adjustable in the preferred embodiment so that a user can modify the pitch.

DETAILED DESCRIPTION OF THE PREFERRED EMBODIMENT

The present invention relates to a tip device (20) that is appended, or otherwise in communication with a blade tip (10) of a turbine blade (60). The tip device (20) is such that it enhances the power production generated from a wind turbine and also reduces the noise signature of the turbine. Essentially, the tip device (20) of the present invention permits the user to achieve the effects of adjusting the pitch of the blade tip (10) of a turbine through the tip device (20) rather than the entire turbine blade (60). The tip device (20) produces an aerodynamic flow jet, with the preferred embodiment compatible with a variety of wind turbines ranging from large to small.

Figure 1:
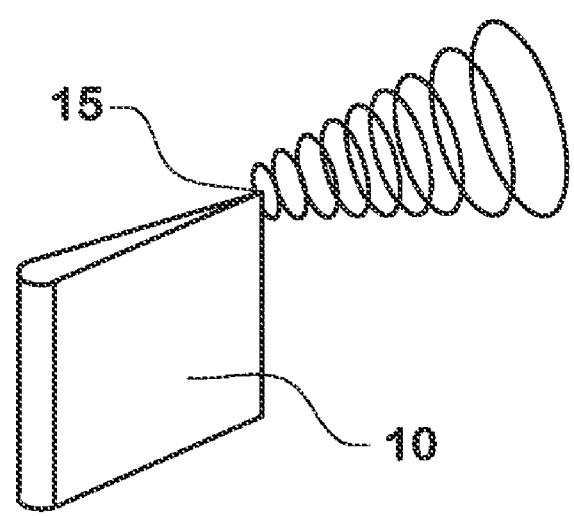
FIG. 1 is a view of a typical blade tip with typical vortex.

In FIG. 1, we see a view of a typical blade tip (10) without the use of the present invention. FIG. 1 is important as it demonstrates the vortex (5) of this typical blade tip (10) is it rotates through the air or wind. With flaps and other aerodynamic compensators, typical blade tips (10) such as in FIG. 1 present gaps or other small items on the trailing edge (15) that work to assist in aerodynamic benefits. However, while the trailing edges (15) seek to increase aerodynamic efficiency, the wind resistance and natural flow also causes relatively high decibel levels in terms of noise. As FIG. 1 indicates, the vortex (5) caused by the trailing edge (15) of a typical blade tip (10) is not dealt with or contained, as is the case with the present invention.

Figure 2:
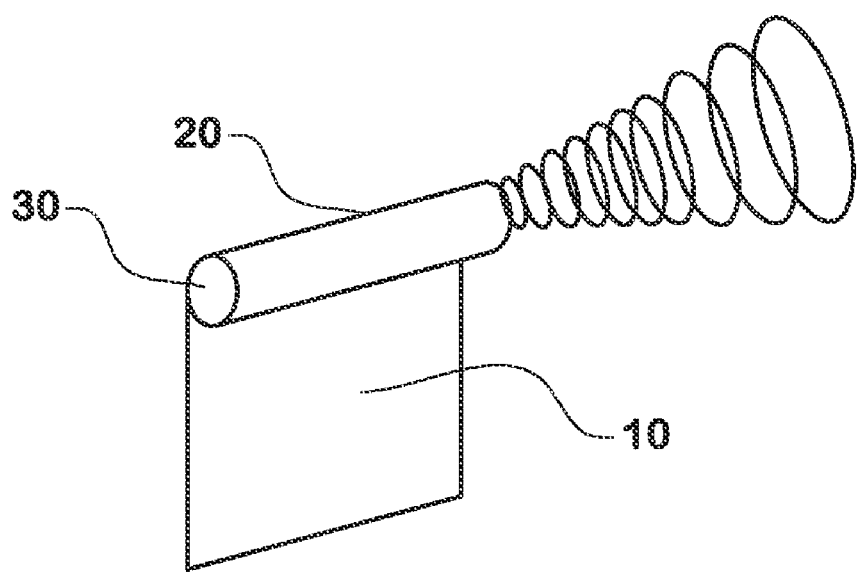
FIG. 2 is a view of the tip device of the present invention and its vortex.

FIG. 2 represents a turbine system of the present invention under the same external conditions as in FIG. 1. As we see in FIG. 2, the blade tip (10) is attached to the tip device (20). The tip device (20) is such that it achieves the noise reduction and increased power production through a plurality of cylinders and/or holes (35) depending on the embodiment. These cylinders or holes (35) are such that as wind passes through the opening, the swirl of the flow is enhanced. The jet flow that is produced, meanwhile, operates on the flowfield around the blade tip for maximum performance and minimal noise output as is seen in this basic drawing relating to the vortex (5) and cylinder (30) of FIG. 2.

The tip device (20) of the present invention achieves its goals of enhanced power production and reduced noise signature by acting on the trailing eddy that is created from the rotating blade of the wind turbine. The tip device (20), also referred to as an appendage, may be formed to have a streamlined or cylindrical shape. The tip device (20), through its cylinder (30) of the preferred embodiment and related internal structure of the cylinder (30), enhances the swirl of the air flow as the wind or air passes through the tip device (20) while the turbine is in motion and cuts through the air. The internal structure of the tip device (20) consists of a textured interior that is more textured or less textured depending on the size of the cylinder (30) and turbine blades (60)s. In the case of FIG. 1, there is a loss of kinetic energy with the trailing edge (15) vortex when typical blade tips (10) rotate and interact with the trailing eddy that is created. When the tip device (20) of the present invention is secured to the blade tip (10) as seen in FIG. 2, the tip device (20) serves to enhance the flow and ultimately constrains these eddies through the use of the opening of the tip device (20) and texture of the internal structure of tip device (20). The eddy effect is minimized due to the interaction between air flow and the tip device (20).

Figure 3:
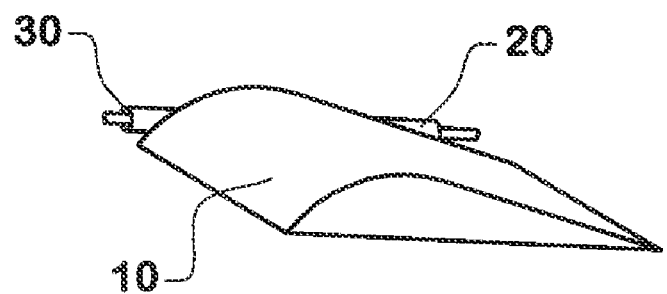
FIG. 3 is a view of a stationary tip device of the present invention.
Figure 8:
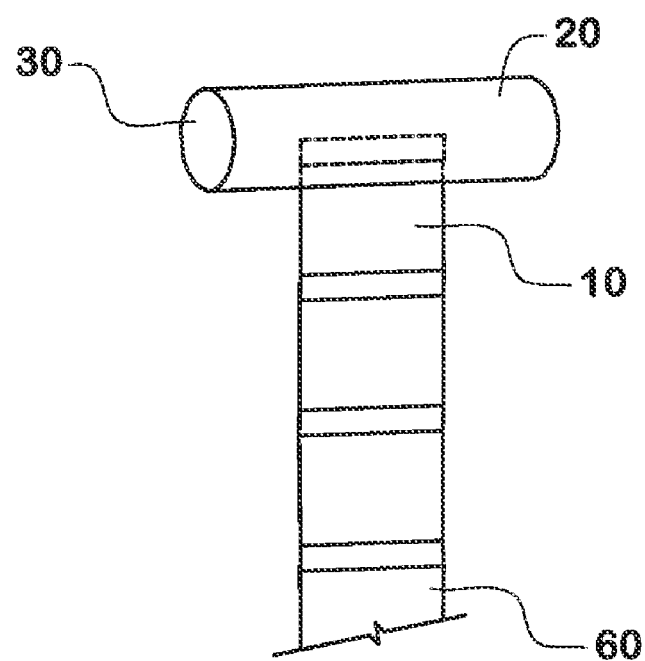
FIG. 8 is an additional view of a tip device embodiment.

As we see in FIG. 3, FIG. 4, FIG. 5 and FIG. 6, the blade tip (10) and tip device (20) may be configured in various ways. FIG. 8 is an additional view of the blade tip (10) and how it can fit into the tip device (20) and cylinder (30). In the preferred embodiment, the tip device (20) as seen in FIG. 3 is passively mounted to the blade tip (10). However, it is important to note that the tip device (20) also may be actively controlled in a more automatic manner. It is conceived that conventional sensors installed on turbine blades (60)s will improve overall performance of the turbine system of the present invention as the tip devices (20) passively or actively modify the flow around the turbine blades (60)s. Conventional actuators are placed with the tip device (20) or integrated into the turbine blade (60).

FIG. 3 depicts a view of the present invention with a stationary tip device (20) appended to the blade tip (10). When the turbine blade (60) rotates, the airflow as seen in FIG. 3 passes into the cylinder (30) of the tip device (20), through the textured interior and ultimately passes out of the opposite side of the cylinder (30).

Figure 4:
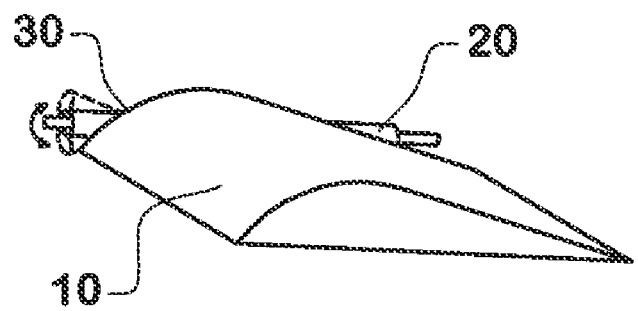
FIG. 4 is a view of an active oscillatory and/or adjustable pitch tip device of the present invention.
Figure 11:
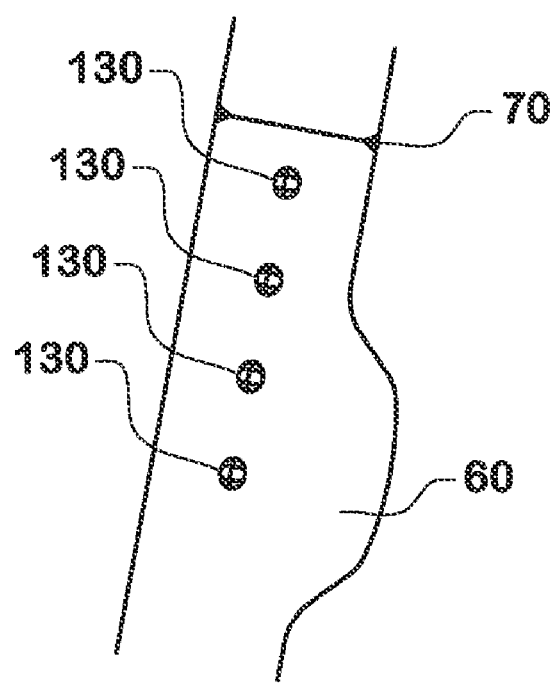
FIG. 11 is a view of a turbine blade with MEMS diaphragms.
Figure 12:
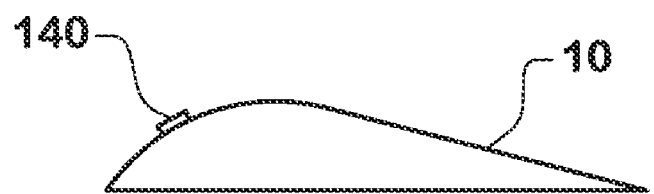
FIG. 12 is a view of an embedded tip device with MEMS based actuators.
Figure 13:
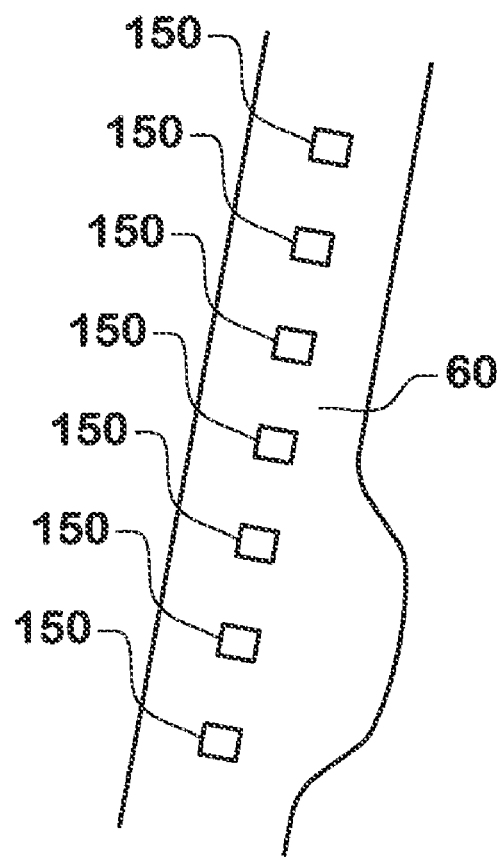
FIG. 13 is a view of a turbine blade with piezo valves.
Figure 14:
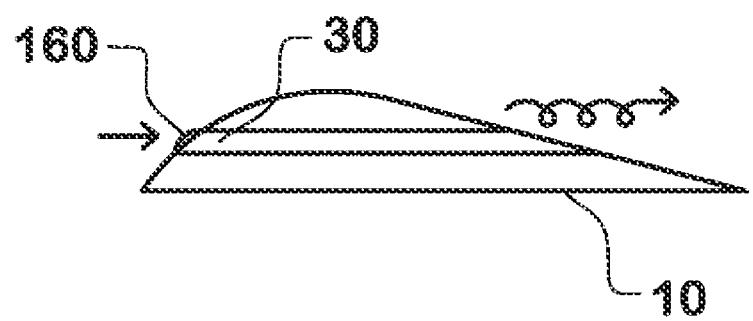
FIG. 14 is a view of an embedded tip device with piezo based actuators.
Figure 15:
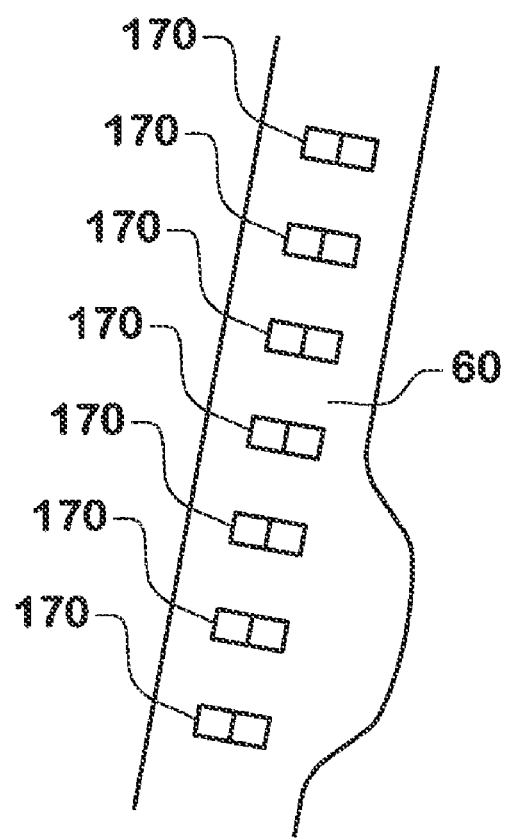
FIG. 15 is a view of a turbine blade with sliding gates.
Figure 16:
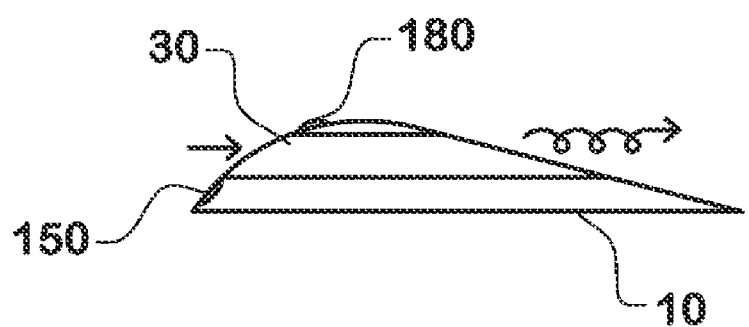
FIG. 16 is a view of an embedded tip device with sliding gate actuators.

FIG. 4 offers a view of the present invention with an active oscillatory tip device (20). The embodiment of FIG. 4 demonstrates that the tip device (20) can have its pitch adjusted or oscillated to effectively deal with changing degrees or levels of wind or airflow. Again, the present invention employs actuators to either passively or actively modify the flow around the turbine blade (60). The actuators in the preferred embodiment are comprised of comprehensive micro-valves and other conventional active devices. In the embodiments where the tip device (20) is embedded within the blade tip (10) under active or hybrid contractuators, it is conceived that the actuators may include MEMS diaphragms (130) as seen in FIG. 11 or MEMS-based actuators (140) placed on the blade tip (10) as seen in FIG. 12. In addition, FIG. 13 offers a view of the turbine blade (60) with piezo valves (150) attached and FIG. 14 offer a view of an actuator embodiment featuring piezo-based actuators (160) placed on the blade tip (10). An additional actuator embodiment of FIG. 15 shows sliding gates (170) attached to the turbine blade (60) and FIG. 16 relates to placing sliding gate actuators (180) on the blade tip (10) to assist in regulating the air pressure.

These actuators will control the blade tip aerodynamics so that the power output of the wind turbine is maximized while the dB signature is reduced. It is conceived that a conventional power controller serves as a sensor to prescribe the optimal power condition based on the ever-changing circumstances relating to airflow. Moreover, it is conceived that a conventional acoustic controller also serves to sense the condition for minimal noise emission. These aspects work in conjunction with the actuators to best determine the proper pitch for which the airflow will enter the tip device (20). What happens when all these aspects of the present invention come together is that the jet flow produced by the tip device (20) operates on the flow field around the blade tip (10) to maximize the performance of the turbine blades (60)s. This includes separation control, noise reduction and power enhancement. The result from the point of view of the user is that the tip device (20) lets the user have the effects of adjusting the pitch through the tip device (20) rather than having to endure the costly and burdensome process of adjusting the pitch through the entire turbine blade (60).

The example in FIG. 4 demonstrates how a tip device (20) can effectively adjust to compensate for the necessary changes in flow. For example, a typical blade tip (10) such as the one shown in FIG. 1 would need to be adjusted along with the entire turbine blade (60) if changes are detected in wind or airflow. As we see in FIG. 4, the sensing aspects described above will cause the tip device (20) to adjust and adapt in such a manner that the stated benefits are achieved without the need to tinker with the entire turbine blade (60).

Figure 9:
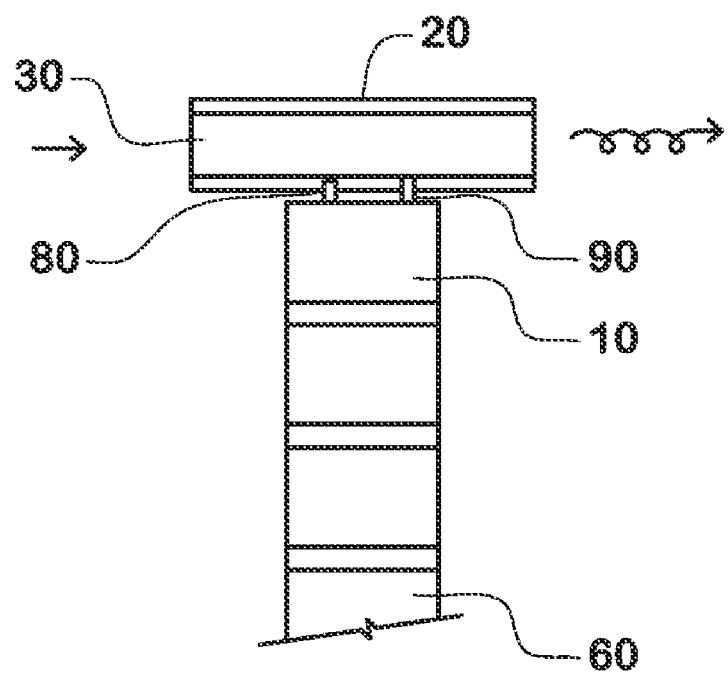
FIG. 9 is a view of a tip device embodiment with a pivot point and stop point.

As mentioned above, the tip device (20) may be passively mounted to the blade tip (10) or actively controlled in an automatic way. For passive configuration, the flow enhancement benefits are achieved as the tip device (20) and overall turbine blade (60) system of the present invention are optimized for a particular rotational speed. This means that the turbine blades (60)s that operate off-peak might not be fully optimized, but the overall performance is optimized. The present invention in the preferred embodiment is such that each tip device (20) can be manually adjusted by the user. For this reason, the tip device (20) has a pivot point (80) and a stop point (90). The pivot point (80) and stop point (90) are best viewed in FIG. 9. Adjustments are conducted in terms of pitch angle at the blade tip (10) location. For example, the view in FIG. 4 may work for a period of time to achieve optimal efficiency. But if the pitch needs to be adjusted a few degrees, the user of the present invention can manually adjust the tip device (20) up or down those few degrees. The user will turn the tip device (20) in that relevant direction, with the tip device (20) turning via the pivot point (80) and halting at the stop point (90). In this way, the flow will be forced through the cylinder (30) of the tip device (20) and then out of the tip device (20) so that the jet flow produced by the tip device (20) operates on the flow field around the blade tip (10). It should be noted that the tip device (20) may need to be oriented at specific angles to achieve its desired function depending on the size of the turbine blade (60). In addition, the system of the present invention also can be retrofitted to existing blades.

The performance of the present invention in the preferred embodiment is estimated at various pitch angles so that the user can opt to maintain the suggested pitch orientation of the tip device (20) or slightly change the pitch orientation based on relevant recommendations from such sources as experts or manufacturers. In opting to change the pitch orientation of the tip device (20), the user will take into account such aspects as mean flow, prevailing wind direction, location of installation, distance from sensitive areas, height of installation and boundary layer analysis.

Figure 10:
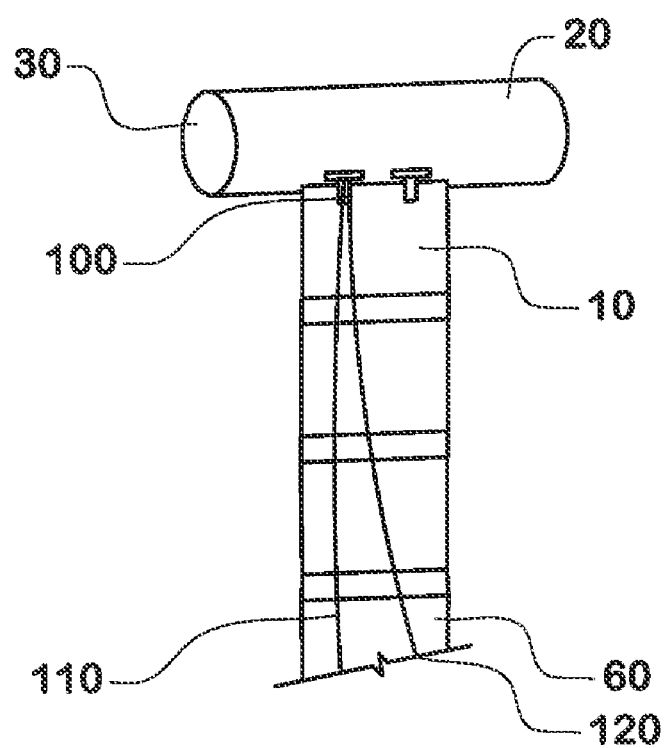
FIG. 10 is a view of a tip device embodiment with a step motor.

An alternative embodiment of the present invention relates to permitting the user to control pitch adjustments in an active or automatic way. This active or automatic way also can work in conjunction with the manual way as a hybrid so that the user will have options and backups in case of unforeseen failure. In regard to the active configuration, the tip device (20) is attached to a conventional step motor (100). The step motor (100), or comparable source, is capable of withstanding the aerodynamic load consistent with wind turbines while also allowing for the adjustment of the tip device (20) as necessary. The step motor (100) is best viewed in FIG. 10. In FIG. 10, we see a first wire (110) and a second wire (120) that is attached to the step motor (100) so that the first wire (110) can serve as a conduit between the step motor (100) and a microcontroller. The second wire (120) is attached to the step motor (100) and serves as a conduit between the step motor (100) and the power source such as a self-power generator. FIG. 10 is an example of a hybrid embodiment of the present invention. In the embodiment relating to the automatic adjustment control, the tip device (20) will adjust automatically to the changes in wind flow via calibrating a conventional smart spring system to the rotational speed of the turbine blade (60). In an additional embodiment of the present invention, a failsafe mechanism also may be used. The failsafe mechanism in this additional embodiment will be used to rotate the cylinder (30) of the tip device (20) 90 degrees of mean flow condition via the use of the step motor (100). This creates more resistance and the turbine blades (60)s will slow down to stop. This additional embodiment relating to the failsafe mechanism also will be used in high-speed wind conditions of about 60 mph.

Figure 5:
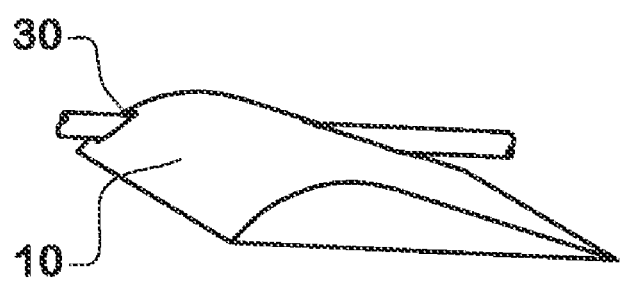
FIG. 5 is a view of an integrated tip device of the present invention.
Figure 6:
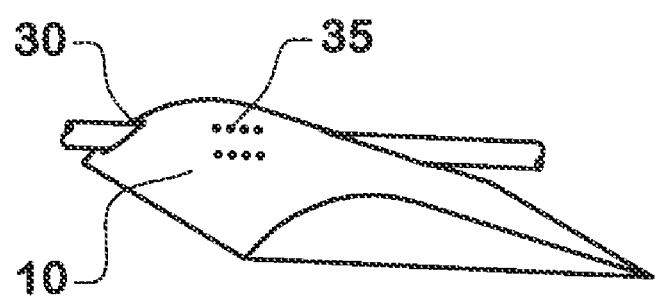
FIG. 6 is a view of an integrated tip device of the present invention with passive or active openings.

FIG. 5 and FIG. 6 depict alternative embodiments of the present invention where the tip device (20) is embedded into the blade tip (10). As FIG. 5 and FIG. 6 demonstrate, the airflow operates in much the same manner as the other embodiments. FIG. 5 offers a view of a cylinder (30) of the embedded tip device (20). FIG. 6 offers a view of a cylinder (30) of an embedded tip device (20) with passive or active openings. The embodiment of FIG. 6 allows for the generation of swirls that pass through the interior of the embedded tip device (20) in order to improve turbine blade (60) efficiency and reduce noise signatures. In the embodiment of FIG. 6, it is conceived that a plurality of cylinders and/or holes (35) may be used to effectively generate the necessary swirl of airflow.

It is important to note that when the tip device (20) is embedded into the blade tip (10), there are several openings within the blade itself. FIG. 6 depicts this aspect through the holes (35). These holes (35) can be open and closed so that either they are always open under the passive configuration, or actively opened and closed through the use of a conventional microelectromechanical diaphragm. The power controller operates in this circumstance to select the most efficient configuration.

A very important component of the acoustic noise level of the present invention is due to the rotor-tower interaction. This noise is produced by passing the turbine blade (60), once per revolution, through the upwind tower shadow for the upwind rotor configurations or through the tower wake for the downwind rotor configuration. Noise and vibration effects can occur in both situations.

It is important to emphasize that one important phenomenon, the dynamic stall, might affect the performance of a wind turbine. Usually wind turbines operate near stall conditions. Wind shear and the presence of the turbine tower can induce dynamic stall into the turbine blade (60). The present invention avoids the dynamic stall phenomenon because wind upstream of the tower is modified by diverting the air around the tower. The power output might change when the blade passes in front of the tower. The sudden load fluctuations can induce structural vibrations and fatigue. The present invention can also be used to reduce and limit the noise produced by this interaction and can be used to reduce vibration produced by the dynamic stall.

Figure 7:
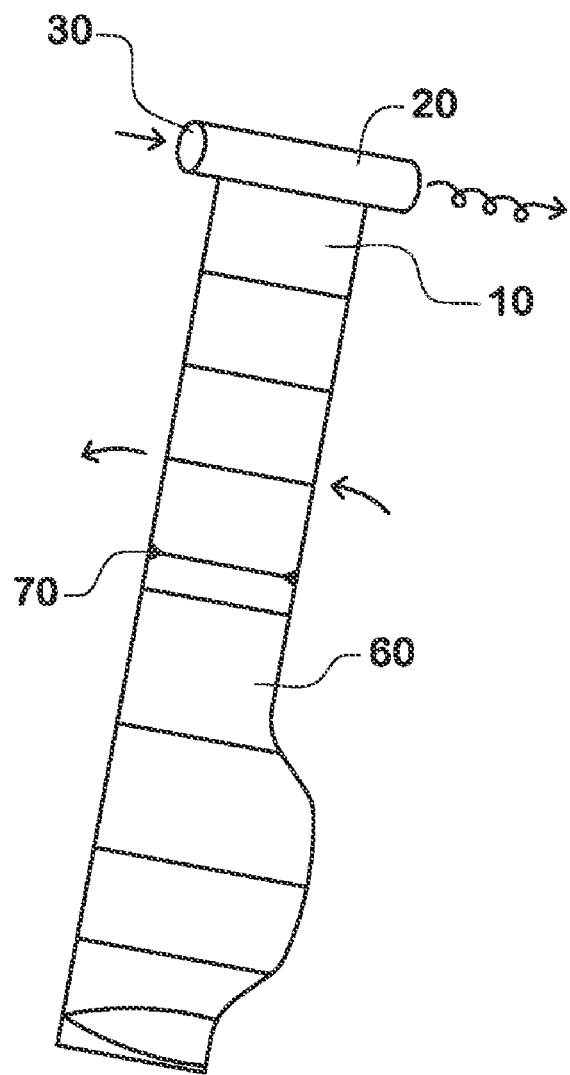
FIG. 7 is a view of a turbine blade in motion.

There are some basic dimensions in an embodiment of the present invention that are just provided to give a qualitative geometrical figure. One appropriate embodiment relates to $\phi<b<<L$. In this respect, $\phi$ is the internal diameter of the appendage, b is the appendage length, L is the span of the turbine blade (60). An example of this embodiment is seen in FIG. 7. In FIG. 7, the span of the turbine blade (60), L, is in a counter-clockwise motion in conjunction with the appendage length, b, which is the length of the tip device (20) of the present invention while also factoring in the internal diameter of the tip device (20), $\phi$.

Another embodiment of the present invention relates to the cylinder (30) being formed small as compared to the size of the turbine blade (60). In this embodiment, c is the chord (70) of the turbine blade (60) as seen in FIG. 7, therefore c≈b means that the cylinder (30) length has comparable length with the blade tip chord.

In the embodiment of FIG. 11, d indicates the diameter of the embedded MEMS valves in relation to the embodiment of d<<c. This means that the openings within the blades are much smaller than the chord (70) of the turbine blade (60).

The dimensions and actuators to be used in the present invention depend on the local velocity on the turbine blade (60), therefore the size of such actuators and openings are variable depending on the size of the blade and nominal design point. Most of the active control actuators can create opening in the order of few millimeters with a fairly small amount of power requested for their operations.

Figure 17:
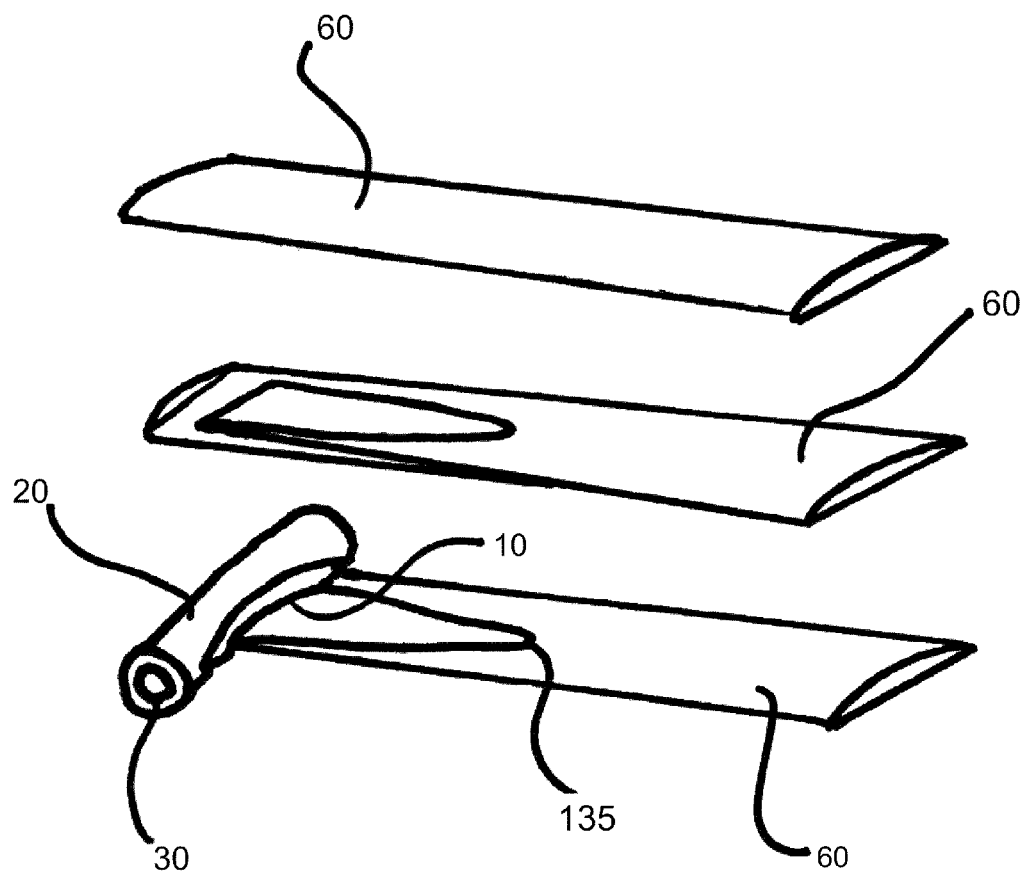
FIG. 17 is a view of a turbine blade and tip device of the present invention.
Figure 18:
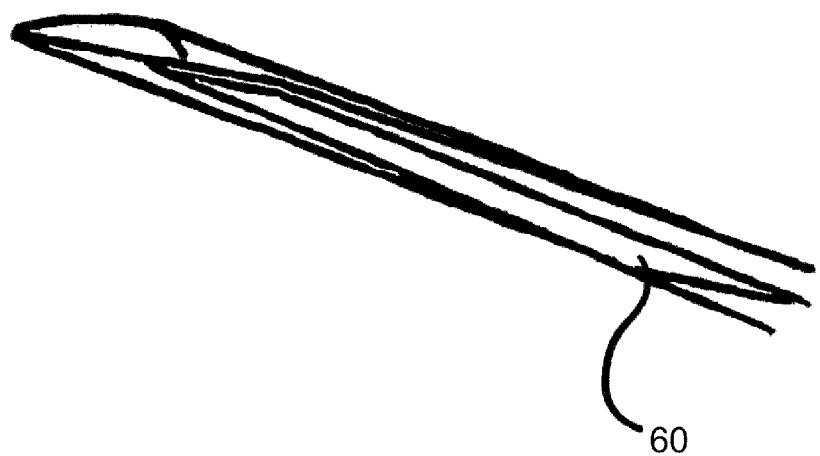
FIG. 18 is a view of a turbine blade of the present invention.
Figure 19:
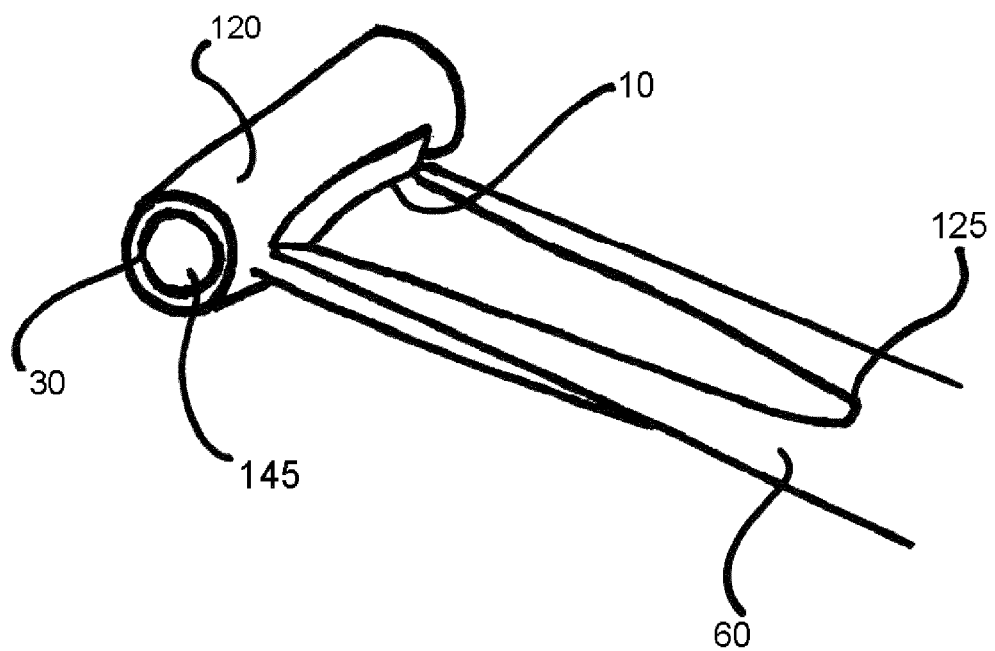
FIG. 19 is an additional view of the tip device and turbine blade of the present invention.
Figure 20:
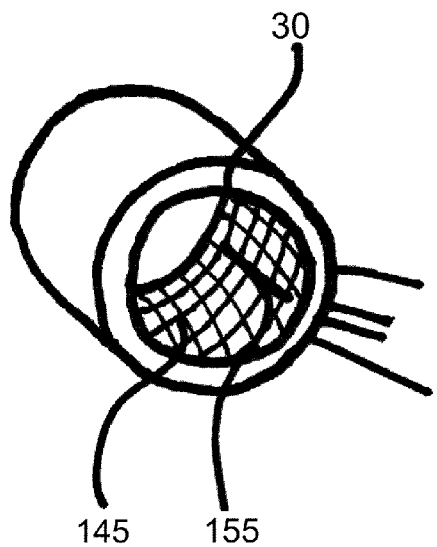
FIG. 20 is a view of the tip device, inner tube wall and extension of the present invention.

FIG. 17, FIG. 18 and FIG. 19 provide a view of the present invention in terms of the center (135) of the turbine blade (60). In the preferred embodiment, the center (135) of the turbine blade (60) is formed to be hollow for large turbine blades (60) and formed to be solid for smaller turbine blades (60). Larger turbine blades (60) relate more to industrial, high-energy generating wind turbines as opposed to their smaller counterparts. It should be noted, as seen in FIG. 20, the turbine blade (60) of the present invention extends through into the inner tube wall (145) of the tip device (20). The result of this blade extension (155) is to create more strength.

As mentioned above, the turbine blades (60) can be "hollow blade" or solid. The embodiment with the hollow blade is a natural extension of what is described above. The only difference pertaining to this hollow blade embodiment is that in the preferred embodiment there is an opening formed into the present invention that will take the flow in and there also are exists formed into the present invention where the flow goes out. With the hollow blade embodiment, it is possible to channel the flow from openings located toward the root of the turbine blade (60) to the blade tip (10) where it can exit either directly from the blade tip (10) or by passing into the tip device (20) and exiting from the jet tube.

We claim:

1. A turbine system, comprising:
    attaching a tip device to a blade tip of a turbine blade;
    forming the tip device to be appended from the blade tip;
    extending the blade tip through an inner tube wall of the tip device;
    forming the tip device to have a textured interior;
    enhancing power production through a plurality of cylinders formed with the tip device;
    reducing noise signature through a plurality of cylinders formed with the tip device;
    producing an aerodynamic flow jet via the tip device; and
    reducing effects of a trailing eddy created from turbine blade rotation by using an opening of the tip device and the textured interior to interact between air flow and the tip device.

2. The turbine system of claim 1, further comprising achieving effects of adjusting pitch of the blade tip by controlling the tip device.

3. The turbine system of claim 1, further comprising enhancing power production through a plurality of holes formed with the tip device.

4. The turbine system of claim 1, further comprising reducing noise signature through a plurality of holes formed with the tip device.

5. The turbine system of claim 1, further comprising passing wind through the cylinders such that a swirl of the air flow is enhanced.

6. The turbine system of claim 1, further comprising operating the air flow on a flowfield around the blade tip.

7. The turbine system of claim 1, further comprising mounting the tip device to the blade tip in a passive manner.

8. The turbine system of claim 1, further comprising controlling the tip device in an active manner.

9. The turbine system of claim 1, further comprising installing conventional sensors on the turbine blade as the tip device passively modifies the air flow around the turbine blade.

10. The turbine system of claim 1, further comprising installing conventional sensors on the turbine blade as the tip device actively modifies the air flow around the turbine blade.

11. The turbine system of claim 1, further comprising placing conventional actuators with the tip device.

12. The turbine system of claim 1, further comprising integrating conventional actuators into the turbine blade.

13. The turbine system of claim 1, further comprising controlling aerodynamics of the blade tip via the actuators and a power controller so that power output is maximized and dB signature is reduced.

14. The turbine system of claim 1, further comprising employing sensors with the tip device to cause the tip device to adjust and adapt to compensate for changes in the air flow.

15. The turbine system of claim 1, further comprising controlling pitch adjustment by attaching a conventional step motor, the step motor having a first wire to serve as a conduit between the step motor and a microcontroller and a second wire to serve as a conduit between the step motor and a power source.

16. The turbine system of claim 1, further comprising calibrating a conventional smart spring system to rotational speed of the turbine blade such that the tip device automatically adjusts to changes in air flow.

17. The turbine system of claim 1, further comprising embedding the tip device into the blade tip such that air flow swirls pass through the textured interior.

18. The turbine system of claim 1, further comprising forming the tip device into a cylindrical shape.

19. A turbine system, comprising:
    attaching a tip device to a blade tip of a turbine blade;
    forming the tip device to be appended from the blade tip;
    extending the blade tip through an inner tube wall of the tip device;
    forming the tip device to have a textured interior;
    enhancing power production through a plurality of cylinders formed with the tip device;

reducing noise signature through a plurality of cylinders formed with the tip device;
producing an aerodynamic flow jet via the tip device;
reducing effects of a trailing eddy created from turbine blade rotation by using an opening of the tip device and the textured interior to interact between air flow and the tip device;
further comprising achieving effects of adjusting pitch of the blade tip by controlling the tip device;
further comprising enhancing power production through a plurality of holes formed with the tip device;
further comprising reducing noise signature through a plurality of holes formed with the tip device;
further comprising passing wind through the cylinders such that a swirl of the air flow is enhanced;
further comprising operating the air flow on a flowfield around the blade tip;
further comprising mounting the tip device to the blade tip in a passive manner;
further comprising controlling the tip device in an active manner;
further comprising installing conventional sensors on the turbine blade as the tip device passively modifies the air flow around the turbine blade;
further comprising installing conventional sensors on the turbine blade as the tip device actively modifies the air flow around the turbine blade;
further comprising placing conventional actuators with the tip device;
further comprising integrating conventional actuators into the turbine blade;
further comprising controlling aerodynamics of the blade tip via the actuators and a power controller so that power output is maximized and dB signature is reduced;
further comprising employing sensors with the tip device to cause the tip device to adjust and adapt to compensate for changes in the air flow;
further comprising controlling pitch adjustment by attaching a conventional step motor, the step motor having a first wire to serve as a conduit between the step motor and a microcontroller and a second wire to serve as a conduit between the step motor and a power source;
further comprising calibrating a conventional smart spring system to rotational speed of the turbine blade such that the tip device automatically adjusts to changes in air flow;
further comprising embedding the tip device into the blade tip such that air flow swirls pass through the textured interior; and
further comprising forming the tip device into a cylindrical shape.

20. A turbine system, comprising:
a tip device in communication with a blade tip of a turbine blade;
said tip device configured to produce an aerodynamic air flow, noise reduction, and increased power through a plurality of cylinders;
said cylinders having an opening such that wind can pass through and a swirl of said air flow is enhanced;
said tip device configured with an internal structure, said internal structure being textured;
said tip device configured with an opening;
said turbine blade configured to be hollow at its center when said turbine blade is large;
said turbine blade configured to be solid at its center when said turbine blade is small; and
said turbine blade configured to extend through said internal structure of said tip device.

* * * * *